(12) United States Patent
Pin

(10) Patent No.: US 12,128,856 B2
(45) Date of Patent: Oct. 29, 2024

(54) CHASSIS CLEANING DEVICE

(71) Applicant: JET TECH PRODUCTS PTY LTD, Labrador (AU)

(72) Inventor: Michael Pin, Labrador (AU)

(73) Assignee: Jet Tech Products Pty Ltd, Labrador (AU)

( * ) Notice: Subject to any disclaimer, the term of this patent is extended or adjusted under 35 U.S.C. 154(b) by 35 days.

(21) Appl. No.: 18/151,092

(22) Filed: Jan. 6, 2023

(65) Prior Publication Data

US 2023/0286472 A1    Sep. 14, 2023

(30) Foreign Application Priority Data

Mar. 11, 2022  (AU) ................................ 2022900595

(51) Int. Cl.
*B60S 3/04* (2006.01)
*H01F 7/02* (2006.01)

(52) U.S. Cl.
CPC . *B60S 3/04* (2013.01); *H01F 7/02* (2013.01)

(58) Field of Classification Search
CPC .. B60S 3/04; B60S 3/008; B60S 3/044; H01F 7/02; H01F 7/0252; B05B 1/14; B05B 13/0627; B05B 15/65; B08B 9/093; B08B 3/04; B08B 9/00
USPC ........................................................ 134/198
See application file for complete search history.

(56) References Cited

U.S. PATENT DOCUMENTS

| | | | | |
|---|---|---|---|---|
| 2,954,038 A | * | 9/1960 | Girard | B08B 9/093 134/179 |
| 3,023,428 A | * | 3/1962 | Otteson | E03C 1/306 4/255.04 |
| 3,120,237 A | * | 2/1964 | Lang | F01M 11/04 134/102.1 |
| 3,897,599 A | * | 8/1975 | Artzer | B60R 15/04 134/167 R |
| 4,054,149 A | * | 10/1977 | Nelson | E03F 1/008 134/167 C |
| 4,107,798 A | * | 8/1978 | Lamb | E03D 11/11 220/203.02 |
| 4,309,788 A | * | 1/1982 | Brager | B60S 3/008 15/88.4 |

(Continued)

Primary Examiner — David G Cormier
Assistant Examiner — Thomas Bucci
(74) Attorney, Agent, or Firm — Lippes Mathias LLP

(57) ABSTRACT

The present invention relates to a device for cleaning the interior of the vehicle chassis rail. The chassis cleaning device having a body with a first end spaced apart from a second end with a longitudinal central axis extending through the body. An inlet connector extends from the first end of the body with the inlet connector adapted to connect to a liquid source. An elongate outlet extends from the second end of the body with the elongate outlet fluidly connected to the inlet connector. At least one discharge outlet is aligned adjacent to an end of the elongate outlet and a plurality of magnets are mounted within the second end of the body and equidistantly positioned around the longitudinal central axis. In use, the elongate outlet is inserted through an aperture in a wall of the chassis rail, the plurality of magnets are adapted to releasably couple the body of the chassis cleaner to the chassis rail and when the liquid source is connected to the inlet connector the liquid is expelled through the at least one discharge outlet to clean the interior of the chassis rail.

16 Claims, 6 Drawing Sheets

(56) References Cited

U.S. PATENT DOCUMENTS

| | | | | |
|---|---|---|---|---|
| 4,527,295 A * | 7/1985 | Lacore | E02D 9/00 | 4/300 |
| 4,642,100 A * | 2/1987 | Kabbaby | E03C 1/046 | 604/150 |
| 4,667,351 A * | 5/1987 | Williams | B05B 1/267 | 239/521 |
| 4,702,267 A * | 10/1987 | Ashraff | B05B 13/0627 | 134/198 |
| 4,887,852 A * | 12/1989 | Hancock | F16L 19/0237 | 285/423 |
| 5,417,460 A * | 5/1995 | Lunder | F16L 33/08 | 285/903 |
| 5,944,483 A * | 8/1999 | Beck | F01D 25/002 | 415/117 |
| 6,427,715 B1 * | 8/2002 | Brockington | B60R 15/00 | 137/239 |
| 6,810,898 B2 * | 11/2004 | Bullock | B60R 15/00 | 137/15.16 |
| 7,225,834 B2 * | 6/2007 | Hampton | F16L 37/248 | 239/524 |
| 7,384,005 B1 * | 6/2008 | Caine | B08B 9/093 | 239/245 |
| 8,091,594 B2 * | 1/2012 | Ray | B67D 7/0294 | 141/346 |
| 2002/0174886 A1 * | 11/2002 | Paper | B60R 15/00 | 134/169 R |
| 2005/0260043 A1 * | 11/2005 | Lange | B65G 53/30 | 406/136 |
| 2008/0047587 A1 * | 2/2008 | Ball | B08B 9/0933 | 134/198 |
| 2010/0122662 A1 * | 5/2010 | Kennington | A01K 1/011 | 422/291 |
| 2011/0315236 A1 * | 12/2011 | Stegall | B60R 15/00 | 137/255 |
| 2016/0095304 A1 * | 4/2016 | Hertzog | A01M 7/0032 | 239/172 |
| 2017/0347788 A1 * | 12/2017 | Outa | A46B 13/02 | |
| 2018/0339318 A1 * | 11/2018 | DesOrmeaux | B08B 9/087 | |

* cited by examiner

CHASSIS CLEANING DEVICE

PRIORITY

This application claims priority from Australian Provisional Patent App. No. 2022900595 filed on Mar. 11, 2022. The entire contents of which are incorporated herein by reference.

FIELD OF THE INVENTION

The present invention relates to a device for cleaning a vehicle chassis and, more particularly, to such implements for cleaning the interior of the chassis rail.

BACKGROUND TO THE INVENTION

It should be noted that reference to the prior art herein is not to be taken as an acknowledgement that such prior art constitutes common general knowledge in the art.

Motor vehicles including trucks, construction equipment, farm equipment and off-road vehicles tend to accumulate deposits, such as sand, mud, dirt, and salt on the exterior and undercarriages of the vehicles. The exterior surfaces of the vehicle are often always kept clean as these surfaces are easily within reach to clean. The underside of the vehicle including the chassis is somewhat more problematic due to being difficult to reach and in most cases vehicle owners simply tend to overlook the underside due to it not being normally visible. It is also time consuming for the vehicle owner to have to hold a hose in place against the chassis rail to flush the interior of the chassis rail to remove any accumulated deposits.

Due to its position the undercarriage of a vehicle is most prone to accumulating these deposits. The undercarriage and in particular, the chassis rail of the vehicle consists of drainage holes that can get clogged or restricted due to this build-up. Sand, mud, dirt, and salt deposits can build up overtime from the road and other places a vehicle may go, especially off-road vehicles. Salt is particularly damaging for vehicles in colder climates as road salt is often used to melt snow and ice formed on roads. Likewise, any vehicle which frequents the beach can accumulate salt from seawater or salt water. The salt speeds up the oxidation process by reacting with the oxygen present in water and can cause the corrosion of metal components. Another issue with the accumulation of salt on a vehicle undercarriage is that it serves as the hygroscopic particle and attracts the water molecule and thus increases the oxidation and corrosion of metal components.

Failing to remove these deposits and debris can cause corrosion over time and lead to structural damage and failure of associated parts. It is also well known that, if allowed to remain in position for extended periods of time, these accumulated deposits can and will cause the premature failure of protective coatings applied to the undercarriage parts. It is particularly difficult to remove these accumulated deposits from the insides surfaces of hollow structural members such as the chassis rails.

There have been a number of attempts to develop a device to clean these accumulated deposits from the undercarriage and in particular, the interior of chassis rails. Most have proven expensive and complex in design or require further devices such as vehicle hoists or ramps in which to gain access to the underside of the vehicle to successfully clean the undercarriage of the vehicle. Some are permanently fixed to the vehicle which are somewhat complex in design and add further permanent components to the chassis of the vehicle which can fail. Professional machine-type, drive through car washes have been developed which clean the underside of the vehicle but do not successfully clean the interior of the chassis rails where sand, mud, dirt, and salt deposits can build up overtime. Also, these professional drive through car washes require the owner of the vehicle to pay each time they use the device. Finally, in most cases professional drive through car washes are not always conveniently located.

Other devices have been devised which simply clean the underside of the vehicle without cleaning the interior of the chassis rail. These include devices with spray jets attached to frames on wheels which are pushed and pulled under the vehicle to clean the undercarriage. Other devices have been devised which require the operator to push a hose with a spray jet attached into the chassis rail and along the chassis rail. This requires the operator to remain attached to the device to move the hose and spray jet along the chassis rail. This is particularly detrimental to the operator especially if chemicals are used to assist with the cleaning process.

Clearly it would be advantageous if a device for cleaning a vehicle chassis could be devised that helped to at least ameliorate some of the shortcomings described above or at least provide the public with a useful choice.

SUMMARY OF THE INVENTION

In accordance with a first aspect, the present invention provides a chassis cleaning device for cleaning the interior of a vehicle chassis rail, the chassis cleaning device comprising: a body having a first end spaced apart from a second end with a longitudinal central axis extending through the body; an inlet connector extending from the first end of the body, the inlet connector adapted to connect to a liquid source; an elongate outlet extending from the second end of the body, the elongate outlet is fluidly connected to the inlet connector; at least one discharge outlet aligned adjacent to an end of the elongate outlet; a plurality of magnets mounted within the second end of the body and equidistantly positioned around the longitudinal central axis; and wherein in use the elongate outlet is inserted through an aperture in a wall of the chassis rail, the plurality of magnets are adapted to releasably couple the body of the chassis cleaner to the chassis rail and when the liquid source is connected to the inlet connector the liquid is expelled through the at least one discharge outlet to clean the interior of the chassis rail.

Preferably, the body may be a cylindrical body and the first end may be a planar circular end formed perpendicular to the longitudinal central axis extending through the cylindrical body.

Preferably, a threaded aperture may be centrally positioned in the first end, the threaded aperture is adapted to receive therein an end of the inlet connector. The inlet connector may be a quick release hose connector.

Preferably, a recessed channel may extend around the periphery of the cylindrical body, the recessed channel provides a user with a finger grip to facilitate removal of the chassis cleaning device from the chassis rail of the vehicle.

Preferably, the second end may be a planar circular end formed perpendicular to the longitudinal central axis extending through the cylindrical body.

Preferably, a plurality of apertures may be equidistantly located and extending around the longitudinal central axis of the planar second end, each aperture receiving therein one of the plurality of magnets. Each one of the plurality of magnets may have an end aligned to sit flush with the planar second end of the cylindrical body when the magnets are received within the apertures. The plurality of magnets may be rare earth magnets.

Preferably, a fluid communication path may be formed between the inlet connector and the at least one discharge outlet such that when the liquid source is connected to the inlet connector the liquid is expelled through the at least one discharge outlet.

Preferably, the body and the elongate outlet may be molded from a plastics material.

Preferably, the elongate outlet may extend from the second end of the body a pre-determined length. The pre-determined length of the elongate outlet may position the at least one discharge outlet approximately in the centre of the chassis rail when the elongate outlet is inserted through the aperture in the wall of the chassis rail.

Preferably, the chassis cleaning device may operate on mains water supply connected to the inlet connector of the chassis cleaning device by a hose. The chassis cleaning device may further comprise a mixing container connected between the hose and the inlet connector. The mixing container may be adapted to add a chemical additive to clean the interior of the chassis rail. The chemical additive may be an eco-friendly salt removing solution.

In accordance with a further aspect, the present invention provides a method of cleaning the interior of a vehicle chassis rail, the method comprising the steps of: i) providing a chassis cleaning device comprising a body with a first end spaced apart from a second end with a longitudinal central axis extending through the body, an inlet connector extending from the first end of the body and adapted to connect to a liquid source, an elongate outlet extending from the second end of the body which is fluidly connected to the inlet connector, at least one discharge outlet aligned adjacent to an end of the elongate outlet, and a plurality of magnets mounted within the second end of the body and equidistantly positioned around the longitudinal central axis of the body; ii) inserting the elongate outlet of the chassis cleaning device through an aperture in a wall of the chassis rail; iii) coupling the chassis cleaning device to the chassis rail by allowing the magnetic field produced by the plurality of magnets in the second end of the body to releasably connect the chassis cleaning device to the chassis rail; and iv) connecting the liquid source to the inlet connector of the chassis cleaning device and expelling the liquid through the at least one discharge outlet cleaning the interior of the chassis rail.

Preferably, the chassis cleaning device may further comprise any one of the features of the first aspect.

In accordance with a still further aspect, the present invention provides a chassis cleaning device for cleaning the interior of a vehicle chassis rail, the chassis cleaning device comprising: a cylindrical body having a planar first end spaced apart from a planar second end with a longitudinal central axis extending through the cylindrical body; a threaded aperture is centrally positioned in the planar first end, the threaded aperture is adapted to receive therein an end of an inlet connector, the inlet connector is adapted to connect to a liquid source; an elongate outlet extending from the second end of the body with at least one discharge outlet aligned adjacent to an end of the elongate outlet, the at least one discharge outlet is fluidly connected to the inlet connector; a plurality of apertures are equidistantly positioned around the longitudinal central axis of the planar second end, each aperture receiving therein a magnet; and wherein in use the elongate outlet is inserted through an aperture in a wall of the vehicle chassis rail, the magnets are adapted to releasably couple the cylindrical body of the chassis cleaner to the vehicle chassis rail and when the liquid source is connected to the inlet connector the liquid is expelled through the at least one discharge outlet to clean the interior of the vehicle chassis rail.

Preferably, the inlet connector may be a quick release hose connector.

Preferably, a recessed channel may extend around the periphery of the cylindrical body, the recessed channel provides a user with a finger grip to facilitate removal of the chassis cleaning device from the chassis rail of the vehicle.

Preferably, each magnet may have an end aligned to sit flush with the planar second end of the cylindrical body when the magnets are received within the apertures. The plurality of magnets may be rare earth magnets.

Preferably, the cylindrical body and the elongate outlet may be molded from a plastics material.

Preferably, the elongate outlet may extend from the second end of the cylindrical body a pre-determined length. The pre-determined length of the elongate outlet may position the at least one discharge outlet approximately in the centre of the vehicle chassis rail when the elongate outlet is inserted through the aperture in the wall of the chassis rail.

Preferably, the chassis cleaning device may operate on mains water supply connected to the inlet connector of the chassis cleaning device by a hose. The chassis cleaning device may further comprise a mixing container connected between the hose and the inlet connector. The mixing container may be adapted to add a chemical additive to clean the interior of the chassis rail. The chemical additive may be an eco-friendly salt removing solution.

Any one or more of the above embodiments or preferred features can be combined with any one or more of the above aspects.

BRIEF DESCRIPTION OF THE DRAWINGS

Notwithstanding any other forms which may fall within the scope of the present invention, a preferred embodiment of the invention will now be described, by way of example only, with reference to the accompanying drawings in which.

DESCRIPTION OF EMBODIMENTS

Figure 1:
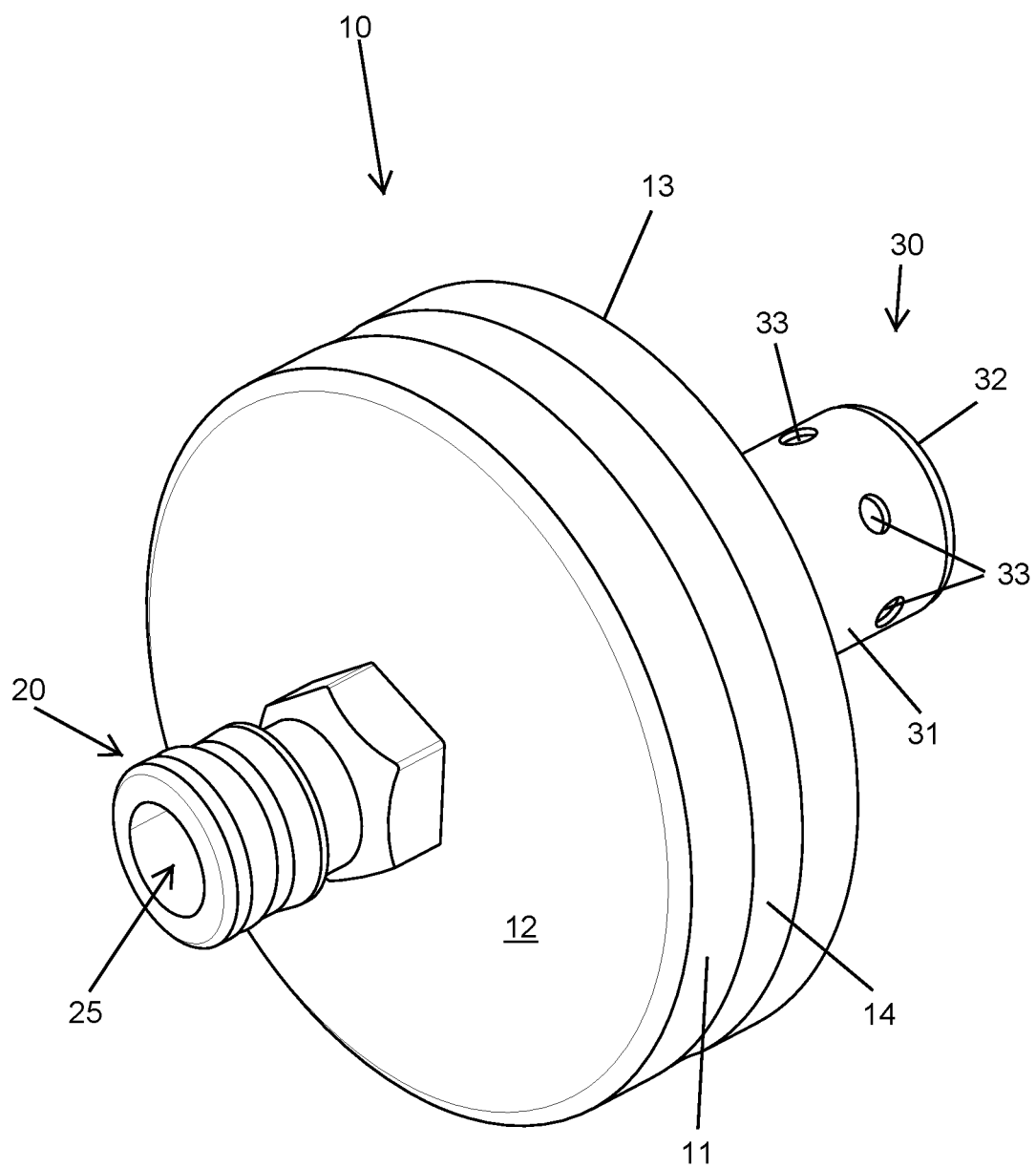
FIG. 1 shows a front perspective view of a chassis cleaner device in accordance with an embodiment of the present invention.

The following description, given by way of example only, is described in order to provide a more precise understanding of the subject matter of a preferred embodiment or embodiments.

It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Reference will now be made to the drawings in which the various elements of embodiments will be given numerical designations and in which embodiments will be discussed so as to enable one skilled in the art to make and use the invention. It will be further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand. Descriptions of well-known components and processing techniques are omitted so as to not unnecessarily obscure the embodiments herein.

It should be noted in the following description that like or the same reference numerals in different embodiments denote the same or similar features.

In the broadest form the present invention provides a chassis cleaning device 10 for cleaning the interior of a vehicle chassis rail 51. The chassis cleaning device 10 has a body 11 with a first end 12 spaced apart from a second end 13 with a longitudinal central axis 16 extending through the centre of the body 11. An inlet connector 20 extends from the first end 12 of the body 11 with the inlet connector 20 adapted to connect to a liquid source 60. An elongate outlet 30 extends from the second end 13 of the body 11 with the elongate outlet 30 fluidly connected to the inlet connector 20. At least one discharge outlet 33 is aligned adjacent to an end 32 of the elongate outlet 30. A plurality of magnets 40 mounted within the second end 13 of the body 11 and are equidistantly positioned around the longitudinal central axis 16 extending through the centre of the body 11. In use the elongate outlet 30 is inserted through an aperture 52 in a wall of the chassis rail 51, the plurality of magnets 40 are adapted to releasably couple the body 11 of the chassis cleaner 10 to the chassis rail 51 and when the liquid source 60 is connected to the inlet connector 20 the liquid is expelled through the at least one discharge outlet 33 to clean the interior of the chassis rail 51.

Figure 2:
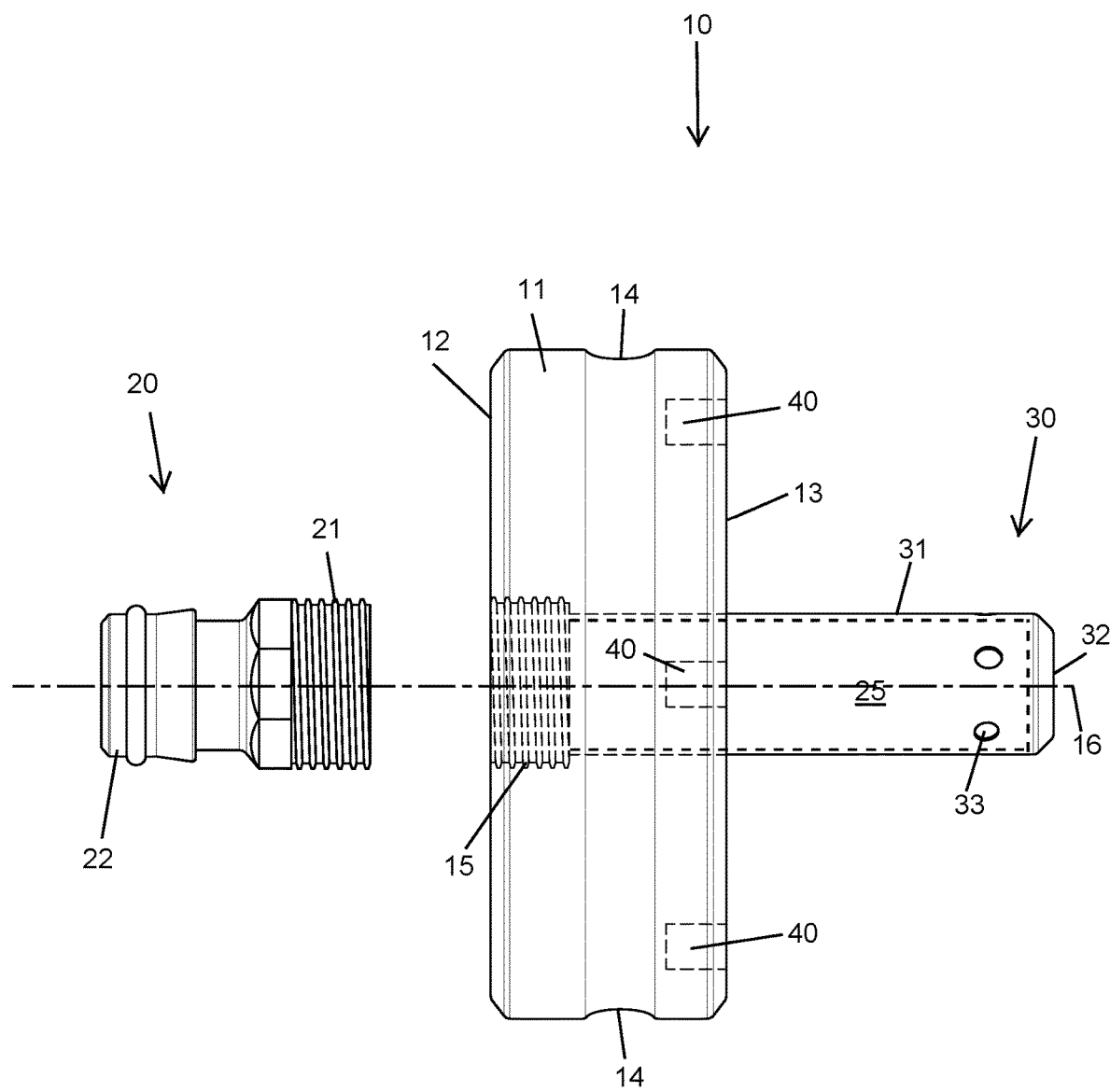
FIG. 2 shows an exploded top view of the chassis cleaner device of FIG. 1.
Figure 3:
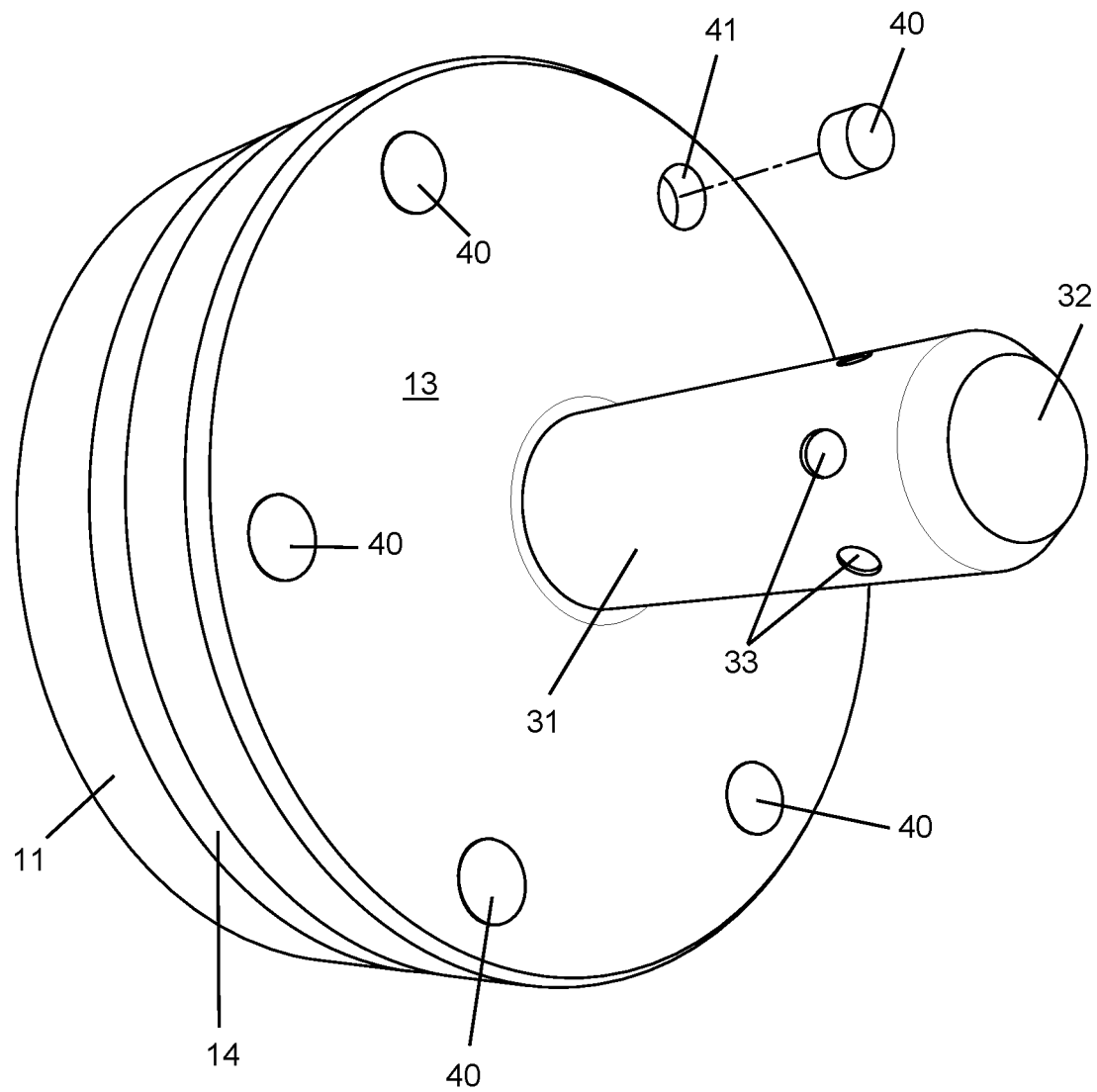
FIG. 3 shows a rear perspective view of the chassis cleaner device shown in FIG. 1.

FIGS. 1 to 3 show views of an embodiment of the vehicle chassis cleaning device 10 in accordance with the present invention. The chassis cleaning device 10 has a cylindrical body 11 with a planar circular first end 12 spaced apart from a planar circular second end 13. Both the first and second ends 12, 13 are planar surfaces formed substantially perpendicular to the longitudinal central axis 16 extending through the centre of the cylindrical body 11. While the present invention will be described and illustrated as having a cylindrical body 11 with a circular cross sectional shape, it should be understood that other shaped bodies 11 are not excluded. For example, in other embodiments the body 11 could have a rectangular prism shaped body 11 with a rectangular cross sectional shape.

A threaded aperture 15 located centrally in the first end 12 receives the external threaded end 21 of a quick release male garden hose connector 20. The hose connector 20 has a first end 22 which is adapted to connect to a complementary female fitting 61 attached to the end of a hose 60 from a mains water supply. In other embodiments, the inlet connector 20 could be a right-angled fitting to change the direction which the hose 60 extends away from the first end 12 of the chassis cleaning device 10. This is beneficial for vehicles which have only a small amount of clearance between the chassis rail 51 and vehicles body.

FIG. 2 illustrates an exploded top view of the vehicle chassis cleaning device 10. An elongate outlet 30 extends centrally from the second end 13 of the cylindrical body 11. Adjacent the end 32 of the elongate outlet 30 are the discharge outlets 33. A fluid communication path 25 is formed between the inlet connector 20 and the discharge outlets 33 in the elongate body 30 of the chassis cleaning device 10. When the hose 60 from the mains water supply is connected to the inlet connector 20 water is expelled through the discharge outlets 33. The elongate outlet 30 is a hollow cylindrical body 31 which in use is inserted through apertures 52 in the chassis rail 51. The length which the elongate outlet 30 extends from the second end 13 is pre-determined to position the discharge outlets 33 substantially in the centre of the chassis rail 51 when the elongate outlet 30 is inserted through apertures 52 in the chassis rail 51. Each discharge outlet 33 is equidistantly spaced around the elongate cylindrical body 31 of the elongate outlet 30 and opens the fluid communication path 25 to allow the fluid to spray from each discharge outlet 33. In this embodiment the discharge outlets 33 are positioned in a line around and equally spaced from the end 32 of the elongate cylindrical body 31. In other embodiments the discharge outlets 33 may be in different positions along the elongate cylindrical body 31 and there may be more than one row of discharge outlets 33 in the elongate outlet 30. Further alternatively, a single larger discharge outlet 33 may be positioned adjacent to the end 32 of the elongate outlet 30.

A recessed channel 14 extends around the periphery of the cylindrical body 11. The recessed channel 14 provides a user with a finger grip to easily remove the chassis cleaning device 10 from the vehicle chassis rail 51.

FIG. 3 shows a rear perspective view of the vehicle chassis cleaning device 10. The second planar side 13 has a plurality of apertures 41 equidistantly positioned around the longitudinal central axis 16 and extending a distance into the cylindrical body 11 from the planar second end 13. The diameter of each aperture 41 is slightly less than the outside diameter of each magnet 40. This allows each magnet 40 to be pressed into an aperture 41 to form an interference fit to secure and hold the magnet 40 in place within the planar second end 13 of the cylindrical body 11. Alternatively, adhesive could be used to secure the magnets 40 within the apertures 41 or any other known securing could be used without departing from the present invention. For example, the magnets 40 could be secured into the apertures 41 using some form of locking clip secured into the apertures 41. The magnets 40 are positioned in the second end 13 to allow the releasable coupling of the chassis cleaning device 10 to the vehicle chassis rail 51. The magnets 40 produce a magnetic field which allows the magnetic attraction to the metal chassis rail 51 which allows the second end 13 of the cylindrical body 11 to releasably connect the chassis cleaning device 10 to the chassis rail 51. When the magnets 40 are secured within the apertures 41 an end of the magnet 40 sits flush with the end surface of the second planar end 13 of the cylindrical body 11.

In this embodiment the magnets 40 are rare-earth magnets. The rare-earth magnets 40 are strong permanent magnets made from alloys of rare-earth elements. Typically, rare-earth magnets 40 produce significantly stronger magnetic fields than other types of magnets such as ferrite or alnico magnets. By way of example only, magnets 40 are made from high quality Neodymium magnetic material and use this material to produce high strength, permanent magnets. The magnets 40 produce a powerful magnetic field, great bonding strength and high coercivity. In other embodiments, different types of permanent magnets 40 may be used provided a strong magnetic bond between the chassis cleaning device 10 and the chassis rail 51 is achieved.

Figure 4:
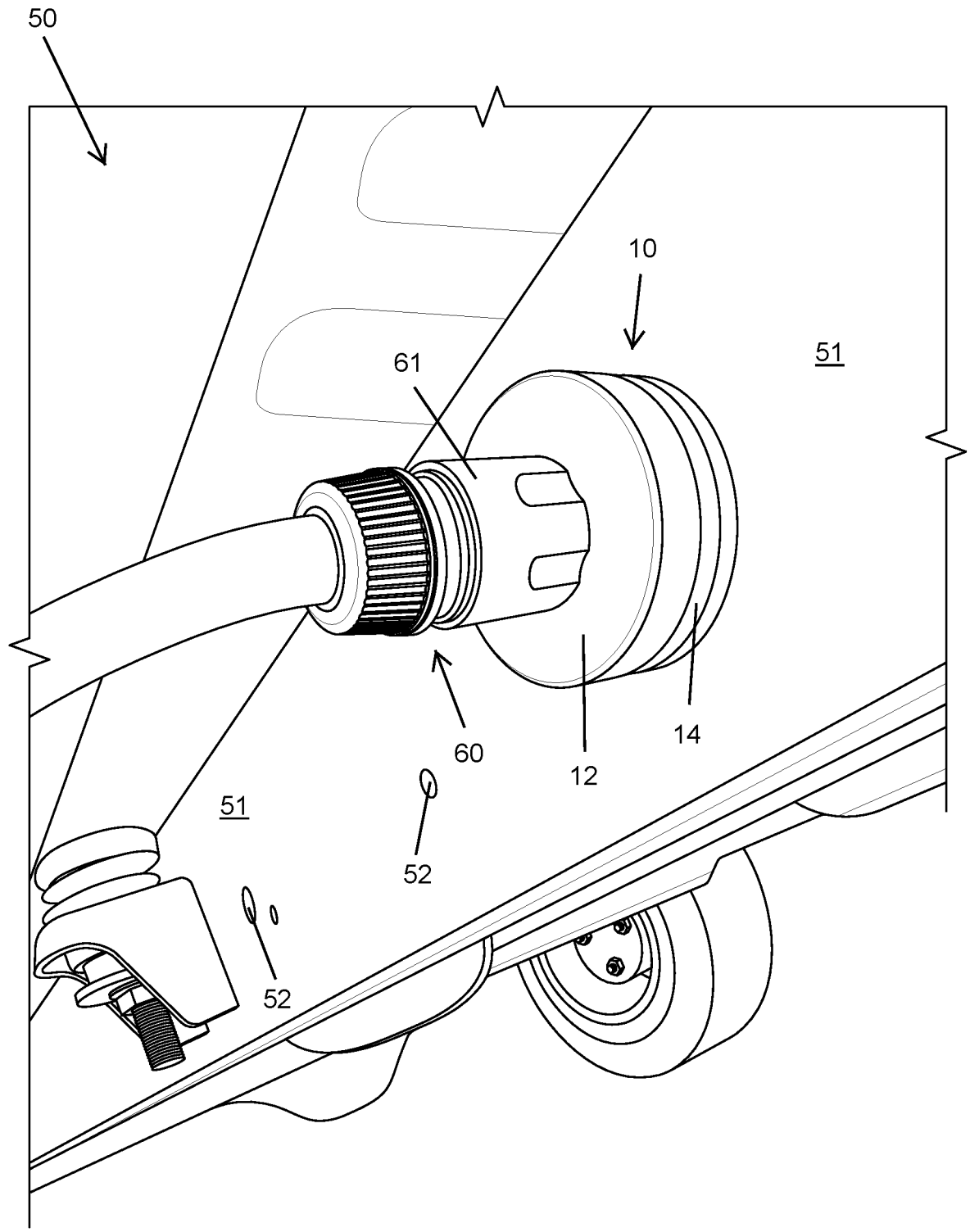
FIG. 4 shows the chassis cleaner device of FIG. 1 installed within an aperture in a chassis rail in accordance with an embodiment of the present invention.
Figure 5:
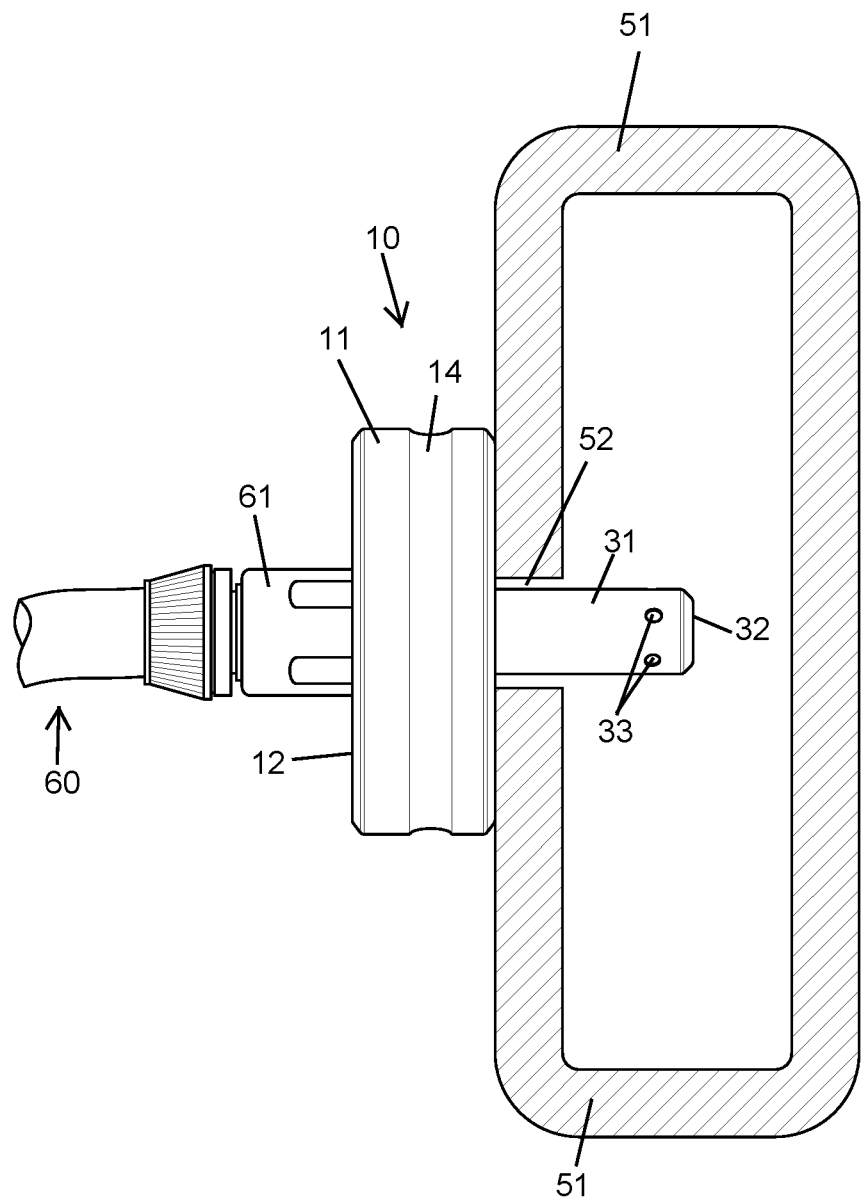
FIG. 5 shows a cross sectional view of the chassis cleaner device of FIG. 1 installed within the chassis rail.

FIGS. 4 and 5 show the vehicle chassis cleaning device 10 in use within the chassis rail 51 of a vehicle 50. FIG. 4 shows the chassis cleaning device 10 magnetically coupled to the chassis rail 51 with a mains water hose 60 and connector 61 attached to the inlet connector 20. FIG. 5 shows a cross-sectional view of the chassis rail 51 with the magnets 40 in the second end 13 of the cylindrical body 11 magnetically coupling the chassis cleaning device 10 to the chassis rail 51. The elongate outlet 30 extends through the aperture 52 in the chassis rail 51 to position the discharge outlets 33 in approximately the centre of the chassis rail 51. The mains water supply is then turned on to expel water from the discharge outlets 33 to clean the interior of the chassis rail 51.

Figure 6:
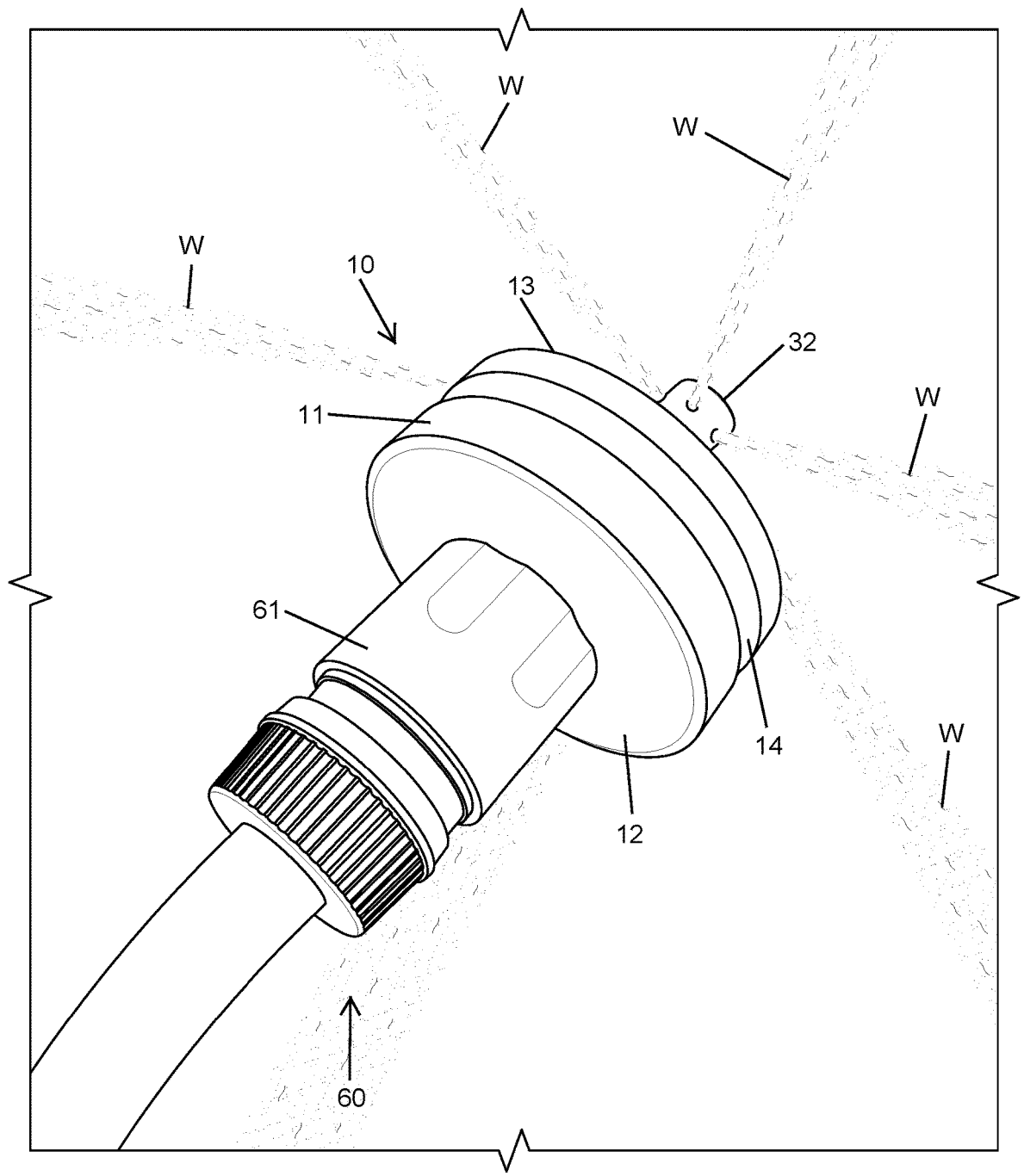
FIG. 6 shows a perspective view of the chassis cleaner device of FIG. 1 attached to a water supply.

FIG. 6 shows the chassis cleaning device 10 removed from the chassis rail 51 and illustrates the jets of water W expelled from each of the discharge outlets 33. The positioning of the discharge outlets 33 symmetrically around the elongate cylindrical body 31 ensures that when the end 32 is inserted within the chassis rail 51 all surfaces of the interior of the chassis rail 51 will be cleaned.

In the current embodiment the cylindrical body 11 and the elongate cylindrical body 31 of the elongate outlet 30 are moulded from a plastics material. For example, the cylindrical body 11 and elongate cylindrical body 31 may be plastic injection moulded using acrylonitrile butadiene styrene (ABS), polyethylene (PE), or the like plastics materials. The quick release male garden hose connector 20 may be a plastic or metal connector. For example, the quick release male garden hose connector 20 may be a brass connector 20.

Alternatively, to form the fluid communication path 25 between the inlet connector 20 and the discharge outlets 33, the centre of the cylindrical body 11 and the elongate cylindrical body 31 are machined along the central longitudinal axis 16. The discharge outlets 33 are then machined into the elongate body 31.

The present invention also provides a method of cleaning the interior of a vehicle chassis rail 51 using the chassis cleaning device 10 as described and illustrated in FIGS. 1 to 3. A user can easily grip the chassis cleaner device 10 by the finger grip channel 14 in the cylindrical body 11. The elongate outlet 30 of the chassis cleaning device 10 is firstly inserted through one of the apertures 52 located in the wall of the chassis rail 51. As the second end 13 of the cylindrical body 11 approaches the chassis rail wall the magnetic field produced by the plurality of magnets 40 in the second end 13 of the cylindrical body 11 releasably couples the chassis cleaning device 10 to the chassis rail 51. With the discharge outlets 33 positioned within the chassis rail 51 the inlet connector 20 is then connected to the mains water supply via hose 60. With the hose 60 connected water can flow through the fluid communication path 25 and out the discharge outlets 33 to clean the interior of the chassis rail 51. As chassis rails 51 extend for a distance along the vehicle undercarriage a user may need to grip the chassis cleaner device 10 using the recessed channel 14 to remove it from within the chassis rail 51 to shift the chassis cleaning device 10 to another aperture 52 further along the chassis rail 51. This ensures that the full length of the chassis rail 51 is cleaned to remove any accumulated deposits of sand, mud, dirt, and salt.

In other embodiments, the chassis cleaner device 10 may further comprise an externally connected mixing container connected between the mains water supply hose 60 and the inlet connector 20. The mixing container may be used to add chemical solutions to the water flowing into the interior of the chassis rail 51 through the chassis cleaning device 10. The chemicals may be required to remove stubborn built up accumulate deposits, such as sand, mud, dirt, and salt from the chassis rails 51. By way of example only, to remove built up deposits of salt from the chassis rail 51 to prevent corrosion, an eco-friendly salt removing solution could be used.

In other embodiments, the chassis cleaning device 10 may be connected to a high-pressure water cleaner to increase the pressure of the water which flows from the discharge outlets 33 of the chassis cleaning device 10. Alternatively, the chassis cleaning device 10 may be connected to a hot water pressure washer.

Advantages

The present invention provides an improved chassis cleaning device which allows the operator to easily clean the interior of the chassis rails of a vehicle.

The present invention advantageously allows the user to releasably connect the chassis cleaning device to the chassis rail using magnetic coupling. This allows the user to connect mains water supply to the inlet connector and then move away from the undercarriage of the vehicle and avoid any overspray from the cleaning process. This is particularly beneficial if chemical solutions are used in the cleaning process.

The present invention provides the user with a cheap reliable option to regularly clean the interior of their vehicle chassis rail at any time and any place. The device does not require any supplementary devices to allow the user to gain access to the chassis rail and can simply be attached to a mains water supply garden hose for cleaning the interior of the vehicle chassis rail.

The present invention allows the user to easily and effectively clean the interior of their chassis rails and prevent the build-up of such contaminants as salt, sand, mud, and dirt. This effectively reduces the chances of corrosion effecting the metal components within the chassis rail and surrounding undercarriage of the vehicle.

Interpretation

EMBODIMENTS

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.
Different Instances of Objects As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.
Specific Details In the description provided herein, numerous specific details are set forth. However, it is understood that embodiments of the invention may be practiced without these specific details. In other instances, well-known methods, structures, and techniques have not been shown in detail in order not to obscure an understanding of this description.
Terminology In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

For the purposes of this specification, the term "plastic" shall be construed to mean a general term for a wide range of synthetic or semisynthetic polymerization products, and generally consisting of a hydrocarbon-based polymer.

As used herein the term "and/or" means "and" or "or" or both.

As used herein "(s)" following a noun means the plural and/or singular forms of the noun.
Comprising and Including In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the baking industries.

The invention claimed is:

1. A vehicle chassis rail cleaning device comprising:
a body having a first end spaced apart from a second end with a longitudinal central axis extending through the body;
an inlet connector extending from the first end of the body, the inlet connector having a first diameter and a first length, the inlet connector is adapted to connect to a liquid source;
a cylindrical elongate outlet extending from the second end of the body, the cylindrical elongate outlet having a second diameter and a second length, the cylindrical elongate outlet is fluidly connected to the inlet connector;
a plurality of discharge outlets aligned adjacent to an end of the cylindrical elongate outlet and positioned equidistantly around the end of the cylindrical elongate outlet;
a plurality of magnets mounted within the second end of the body and equidistantly positioned around the longitudinal central axis; and
wherein the first diameter of the inlet connector is larger than the second diameter of the cylindrical elongate outlet;
wherein the first length of the inlet connector is less than the second length of the cylindrical elongate outlet;
wherein the magnets are adapted to releasably couple the vehicle chassis rail cleaning device to a vehicle chassis rail;
wherein the cylindrical elongate outlet extends through an aperture in a wall of the vehicle chassis rail; and
wherein the vehicle chassis rail cleaning device is adapted to clean an internal surface of the vehicle chassis rail.

2. A vehicle chassis rail cleaning device as claimed in claim 1, wherein the body is a cylindrical body, and the first end is a planar circular end formed perpendicular to the longitudinal central axis extending through the cylindrical body.

3. A vehicle chassis rail cleaning device as claimed in claim 1, wherein a threaded aperture is centrally positioned in the first end, the threaded aperture is adapted to receive therein an end of the inlet connector, the inlet connector is a quick release hose connector.

4. A vehicle chassis rail cleaning device as claimed in claim 2, wherein a recessed channel extends around the periphery of the cylindrical body, the recessed channel provides a user with a finger grip to facilitate removal of the chassis cleaning device from the chassis rail of the vehicle.

5. A vehicle chassis rail cleaning device as claimed in claim 2, wherein the second end is a planar circular end formed perpendicular to the longitudinal central axis extending through the cylindrical body.

6. A vehicle chassis rail cleaning device as claimed in claim 5, wherein a plurality of apertures are equidistantly located and extending around the longitudinal central axis of the planar second end, each aperture receiving therein one of the plurality of magnets.

7. A vehicle chassis rail cleaning device as claimed in claim 6, wherein each one of the plurality of magnets has an end aligned to sit flush with the planar second end of the cylindrical body when the magnets are received within the apertures.

8. A vehicle chassis rail cleaning device as claimed in claim 1, wherein the plurality of magnets are rare earth magnets.

9. A vehicle chassis rail cleaning device as claimed in claim 1, wherein the cylindrical elongate outlet extends from the second end of the body a pre-determined length.

10. A vehicle chassis rail cleaning device as claimed in claim 9, wherein the pre-determined length of the cylindrical elongate outlet positions the plurality of discharge outlets approximately in the centre of the chassis rail when the elongate outlet is inserted through the aperture in the wall of the chassis rail.

11. A vehicle chassis rail cleaning device as claimed in claim 1, wherein the chassis cleaning device operates on mains water supply connected to the inlet connector of the chassis cleaning device by a hose.

12. A vehicle chassis rail cleaning device comprising:
a cylindrical body having a planar first end spaced apart from a planar second end with a longitudinal central axis extending through the cylindrical body;
a threaded aperture is centrally positioned in the planar first end, the threaded aperture is adapted to receive therein an end of an inlet connector having a first diameter and a first length, the inlet connector is adapted to connect to a liquid source;
a cylindrical elongate outlet extending from the second end of the body having a second diameter and a second length;
plurality of discharge outlets aligned adjacent to an end of the cylindrical elongate outlet and positioned equidistantly around the end of the cylindrical elongate outlet, the plurality of discharge outlets are fluidly connected to the inlet connector;
a plurality of apertures are equidistantly positioned around the longitudinal central axis of the planar second end, each aperture receiving therein a magnet; and
wherein the first diameter of the inlet connector is larger than the second diameter of the cylindrical elongate outlet;
wherein the first length of the inlet connector is less than the second length of the cylindrical elongate outlet;
wherein the magnets are adapted to releasably couple the vehicle chassis rail cleaning device to a vehicle chassis rail;
wherein the cylindrical elongate outlet extends through an aperture in a wall of the vehicle chassis rail; and
wherein the vehicle chassis rail cleaning device is adapted to clean an internal surface of the vehicle chassis rail.

13. A vehicle chassis rail cleaning device as claimed in claim 12, wherein the inlet connector is a quick release hose connector.

14. A vehicle chassis rail cleaning device as claimed in claim 12, wherein a recessed channel extends around the periphery of the cylindrical body, the recessed channel provides a user with a finger grip to facilitate removal of the chassis cleaning device from the chassis rail of the vehicle.

15. A vehicle chassis rail cleaning device as claimed in claim 12, wherein each magnet has an end aligned to sit flush with the planar second end of the cylindrical body when the magnets are received within the apertures, and the magnets are rare earth magnets.

16. A vehicle chassis rail cleaning device as claimed in claim 12, wherein the cylindrical elongate outlet extends from the second end of the cylindrical body a pre-determined length, the pre-determined length of the cylindrical elongate outlet positions the plurality of discharge outlets approximately in the centre of the vehicle chassis rail when the elongate outlet is inserted through the aperture in the wall of the chassis rail.

* * * * *